G. I. SNYDER.
BALL BEARING HANGER.
APPLICATION FILED JUNE 15, 1921.

1,419,420. Patented June 13, 1922.

Inventor
G. I. Snyder.

By Watson E. Coleman
Attorney

UNITED STATES PATENT OFFICE.

GUSTAVE IRVIN SNYDER, OF MEDIX RUN, PENNSYLVANIA.

BALL-BEARING HANGER.

1,419,420.    Specification of Letters Patent.    Patented June 13, 1922.

Application filed June 15, 1921. Serial No. 477,818.

*To all whom it may concern:*

Be it known that I, GUSTAVE IRVIN SNYDER, a citizen of the United States, residing at Medix Run, in the county of Elk and State of Pennsylvania, have invented certain new and useful Improvements in Ball-Bearing Hangers, of which the following is a specification, reference being had to the accompanying drawings.

This invention relates to hangers and particularly to hangers for supporting swings, hammocks and like movable objects.

It is an object of the invention to provide a hanger of this character which eliminates wear to a large extent by providing a novel form of bearing which is self-lubricated.

It is another object of the invention to provide a hanger of this character including a stationary and a movable member, the stationary member being provided with a socket adapted to receive lubricant and also to receive the ball bearing member carried by the movable member so that in addition to the self-lubricating feature, the movable member is also provided with a ball bearing.

It is also an object of the invention to provide a hanger of this character including a stationary hook member and a movable hook member, the stationary hook member having a socket or cup for the reception of lubricant, said cup or socket having bearings formed in its side walls and adapted to receive a portion of the movable hook member, the movable hook member having a ball bearing adapted to extend into the socket to engage the bottom of the socket and to distribute lubricant to the bearings of the socket.

It is still a further object of the invention to provide a hanger of this character wherein the formation of the hook on the stationary member is not interfered with by the socket or bearings of the socket, so that accidental disengagement of the movable hook member from the stationary hook member is prevented.

With these and other objects in view the invention consists in the improved construction and arrangement of parts to be hereinafter more particularly described, fully claimed and illustrated in the accompanying drawings, in which:—

Figure 1:
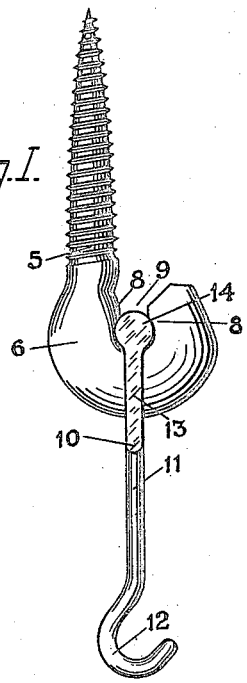
Figure 1 is a side elevation of a ball bearing hanger constructed in accordance with an embodiment of the invention.
Figure 2:
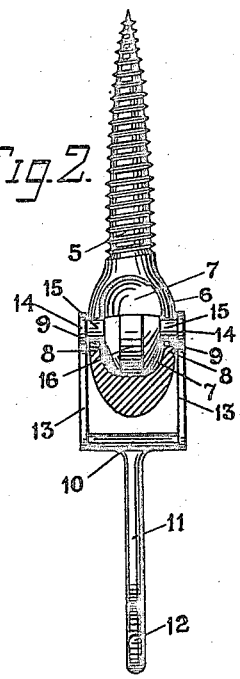
Figure 2 is a front elevation, the stationary support being shown partly in section.
Figure 3:
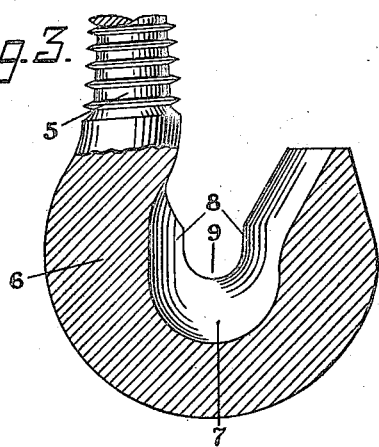
Figure 3 is an enlarged sectional view of the support.
Figure 4:
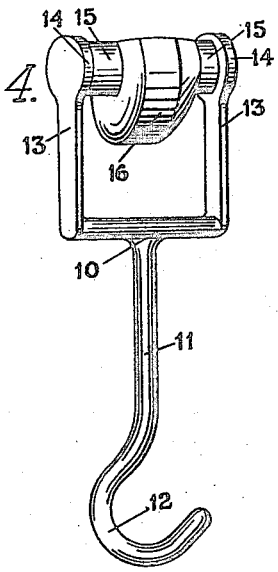
Figure 4 is a perspective view of the movable hook member.

Referring to the drawings 5 designates the shank of a stationary support or hook member; said shank being threaded for the connection of a support. The end 6 of the hook member is enlarged, the sides of said enlarged portion tapering toward the extremity of said end, while the end of the bill of the hook is relatively broad.

A socket 7 is formed in the upper face of the enlarged portion of the hook, said socket extending from the shank of the hook to the end of the bill of the hook, and is adapted to receive lubricant. Each of the side walls 8 of the socket has a recess 9 formed therein at the intermediate portion of said wall, the upper edges of the socket inclining from the end of the bill of the hook and the shank toward the recesses. The recesses 9 are adapted to register one with the other and are disposed in spaced relation to the bottom of the socket and substantially midway between the end of the bill and bottom of the hook.

In connection with the stationary hook member or support 5, a movable hook member or support 10 is used, said member including a shank 11 having a hook 12 formed on one end thereof and a yoke 13 formed on its opposite end, the arms of the yoke being provided with openings 14 adapted to receive a shaft 15. The shaft 15 is provided at its intermediate portion with a protuberance 16, said protuberance being substantially semi-circular and having its side portions tapering toward the periphery of said protuberance to form a rocker member and to also conform to the shape of the socket 7. The protuberance 16 is adapted to support the hook through the medium of the stationary hook member 5 by engagement with the bottom of the socket, the ends of the shaft being arranged to project through the recesses 9 and beyond the side walls 8 of the socket, while the arms of the yoke 13 extend down the sides of the socket in spaced relation thereto. It will be noted that the shaft is disposed a considerable distance below the end of the bill of the hook and also below the edges of the walls 8, the recesses 9 serving as guides to properly position the movable hook with respect to the stationary hook and to assist in preventing disengagement of the movable hook from the stationary hook. The ball bearing member or protuberance 16 is disposed within the socket and is intended to support the movable hook member. In addition to this, a lubricant is placed within the socket to reduce friction and wear, and as the socket forms a bearing for the protuberance 16 and also the oil cup, there is no danger of oil dripping from the movable hook member, which would be the case if a separate oil cup were used. In addition to this, the recesses 9 are of a diameter sufficient to receive the end portion of the shaft 15, so as to prevent movement of the shaft from the bill of the hook to the shank and also to prevent disengagement of the movable hook member from the stationary hook member. The shaft 15 is held in spaced relation to the bottom of the recesses 9 through the medium of the ball bearing or protuberance. At the same time, the bill of the hook, in view of the enlarged end portion of the stationary hook member 5, prevents the lubricant from being splashed from the socket and also provides an inclined or curved surface down which the shaft may pass during movement of the movable hook member. Longitudinal movement of the shaft 15 is also prevented by the protuberance 16 and the arms of the yoke 13. Should the movable hook member be moved upwardly, that is away from the socket of the stationary hook, it will not be disengaged, as the bill of the stationary hook will engage the yoke. The only way the movable hook can be disengaged is to move the shank 11 in angular relation to the bill of the stationary hook.

From the foregoing it will be readily seen that this invention provides a novel form of hanger which is not only provided with a ball bearing to prevent wear and noise, but wherein the socket of the stationary hook serves as an oil cup to lubricate the bearings. In addition to this, the connection of the movable hook member with the stationary hook member is relatively loose, so that friction is reduced and the movable hook member permitted to respond to the slightest movement of objects supported by the hook. Furthermore, the entire strain of the movable hook is on the protuberance 16, which is movable in the socket and the lubricant within the socket. Should it be necessary to remove the movable hook member, this may be accomplished by swinging the movable hook member upwardly so as to extend the yoke 13 over the bill of the stationary hook, whereupon the shaft 15 may be readily disengaged from the recesses 9.

What is claimed is:—

1. A hanger of the character described comprising a stationary hook member, the hook member being enlarged and provided with a socket, the side walls of said socket having registered recesses, a movable hook member, one end of said hook member being formed into a yoke, a shaft carried by the yoke, said shaft having a rocker member formed at its intermediate portion, said rocker member being adapted to extend into and engage the walls of the socket to support the shaft in spaced relation to the walls of the socket.

2. A hanger of the character described comprising a supporting member including a threaded shank, one end of said member being enlarged and formed into a socket, the side walls of said socket tapering toward the bottom of said enlarged portion, the upper edges of said walls having registered recesses, said socket being arranged to receive lubricant, a movable hook member having a yoke formed in one end, said yoke being adapted to receive the enlarged portion of the supporting member, a shaft connecting the ends of the yoke, said shaft being adapted to extend laterally of the enlarged portion of the supporting member, and means carried by the intermediate portion of said shaft for engagement with the bottom of the socket to provide a bearing for the movable hook member, the end portions of said shaft being held in spaced relation to the recesses of the socket through the medium of said bearings.

In testimony whereof I hereunto affix my signature.

G. IRVIN SNYDER.